United States Patent
Choi et al.

(10) Patent No.: US 12,415,144 B2
(45) Date of Patent: Sep. 16, 2025

(54) HEAT INTEGRATION SEPARATION SYSTEM

(71) Applicant: LG CHEM, LTD., Seoul (KR)

(72) Inventors: Yong Suk Choi, Daejeon (KR); Sung Kyu Lee, Daejeon (KR); Yeon Uk Choo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/271,433

(22) PCT Filed: Jun. 16, 2022

(86) PCT No.: PCT/KR2022/008578
§ 371 (c)(1),
(2) Date: Jul. 7, 2023

(87) PCT Pub. No.: WO2023/058838
PCT Pub. Date: Apr. 13, 2023

(65) Prior Publication Data
US 2024/0058722 A1    Feb. 22, 2024

(30) Foreign Application Priority Data
Oct. 8, 2021 (KR) .................. 10-2021-0134244

(51) Int. Cl.
*B01D 3/14* (2006.01)
*B01D 3/00* (2006.01)

(52) U.S. Cl.
CPC ............. *B01D 3/007* (2013.01); *B01D 3/143* (2013.01)

(58) Field of Classification Search
CPC .............................. B01D 3/007; B01D 3/143
See application file for complete search history.

(56) References Cited

U.S. PATENT DOCUMENTS 4,360,405 A * 11/1982 Tsao .................. B01D 3/322
                                                        203/88
4,636,284 A *  1/1987 English ............... B01D 3/40
                                                        203/84
(Continued)

FOREIGN PATENT DOCUMENTS

CN    102355928 A    2/2012
CN    103816691 A    5/2014
(Continued)

OTHER PUBLICATIONS

Lin, et al. (2020). Energy-Efficient Separation Design of Diisopropylether/isopropanol/water System Having Three Distillation Regions and Liquid-liquid Envelope, Separation and Purification Technology, vol. 251, 117292, pp. 1-13.

*Primary Examiner* — Jonathan Miller
(74) *Attorney, Agent, or Firm* — Bryan Cave Leighton Paisner LLP

(57) ABSTRACT

Provided is a heat integration separation system including a first column, a second column, a compressor, a first heat exchanger and a second heat exchanger, wherein an upper discharge stream of the first column passes through the compressor to be compressed and then heat-exchanged with a lower discharge stream of the second column in the second heat exchanger, wherein an upper discharge stream of the second column is heat-exchanged with a lower discharge stream of the first column in the first heat exchanger, and wherein the heat integration separation system satisfies Equation 1 (refer to the specification).

11 Claims, 7 Drawing Sheets

(56) References Cited

U.S. PATENT DOCUMENTS

| | | | | |
|---|---|---|---|---|
| 4,718,986 | A * | 1/1988 | Comiotto | C07C 7/04 203/80 |
| 5,124,004 | A * | 6/1992 | Grethlein | B01D 3/007 203/50 |
| 5,252,187 | A * | 10/1993 | Ohtsu | B01D 1/26 203/84 |
| 5,294,304 | A * | 3/1994 | Kano | C07C 29/84 568/918 |
| 5,435,436 | A * | 7/1995 | Manley | B01D 3/143 203/88 |
| 6,403,854 | B1 * | 6/2002 | Miller | C07C 1/20 585/804 |
| 8,182,654 | B2 * | 5/2012 | Sechrist | B01D 3/14 203/99 |
| 9,770,674 | B2 * | 9/2017 | Lee | C07C 7/005 |
| 9,851,140 | B2 * | 12/2017 | Wakabayashi | F25J 1/0022 |
| 9,908,060 | B2 * | 3/2018 | Wakabayashi | B01D 3/322 |
| 10,022,648 | B2 * | 7/2018 | Maedebach | B01D 3/007 |
| 10,039,997 | B2 * | 8/2018 | Filippi | B01D 3/002 |
| 10,464,867 | B2 * | 11/2019 | Lee | B01D 3/42 |
| 10,486,080 | B2 * | 11/2019 | Choo | B01D 3/143 |
| 11,103,803 | B2 * | 8/2021 | Kim | B01D 1/28 |
| 2008/0135396 | A1 * | 6/2008 | Blum | B01D 3/322 203/25 |
| 2009/0101086 | A1 * | 4/2009 | Blanchette | C02F 1/26 203/55 |
| 2012/0137727 | A1 | 6/2012 | Huang et al. | |
| 2014/0131191 | A1 * | 5/2014 | Tachikawa | B01D 3/007 202/160 |
| 2016/0082363 | A1 * | 3/2016 | Lee | B01D 3/322 202/161 |
| 2017/0320796 | A1 * | 11/2017 | Lee | B01D 3/32 |
| 2020/0179820 | A1 * | 6/2020 | Kim | B01D 5/0063 |

FOREIGN PATENT DOCUMENTS

| | | |
|---|---|---|
| CN | 105964007 A | 9/2016 |
| CN | 110741067 A | 1/2020 |
| DE | 19903781 A1 | 8/2000 |
| EP | 2617479 A1 | 7/2013 |
| EP | 2732859 A1 | 5/2014 |
| JP | 2012-504723 A | 2/2012 |
| JP | 2015-100724 A | 6/2015 |
| JP | 2016-524522 A | 8/2016 |
| KR | 10-2000-0005637 A | 1/2000 |
| KR | 10-2010-0097092 A | 9/2010 |
| KR | 10-2011-0133984 A | 12/2011 |
| KR | 10-2016-0051665 A | 5/2016 |
| KR | 10-2016-0150150 A | 12/2016 |
| KR | 10-2018-0134307 A | 12/2018 |
| KR | 10-2019-0022160 A | 3/2019 |
| KR | 10-2019-0056739 A | 5/2019 |
| KR | 10-2019-0077669 A | 7/2019 |
| KR | 10-2021-0025806 A | 3/2021 |
| WO | 2007048242 A2 | 5/2007 |
| WO | 2012056278 A2 | 5/2012 |

* cited by examiner

[FIG. 1]
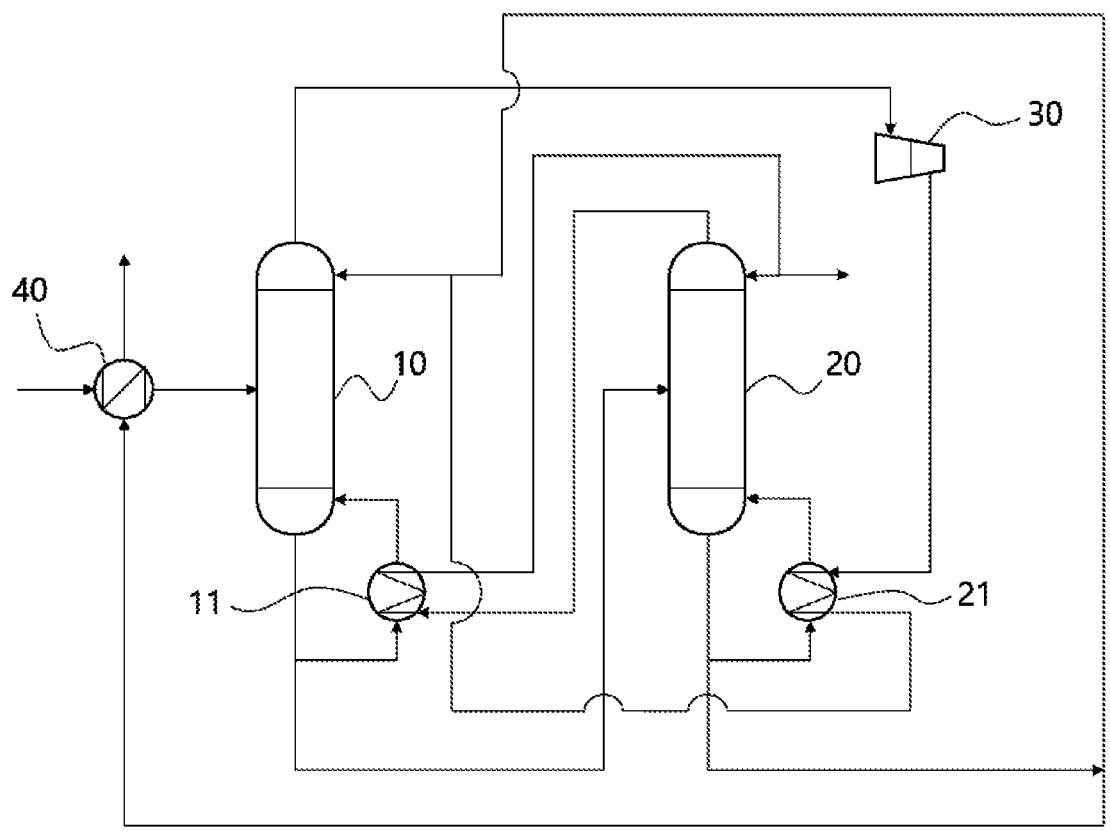

[FIG. 2]
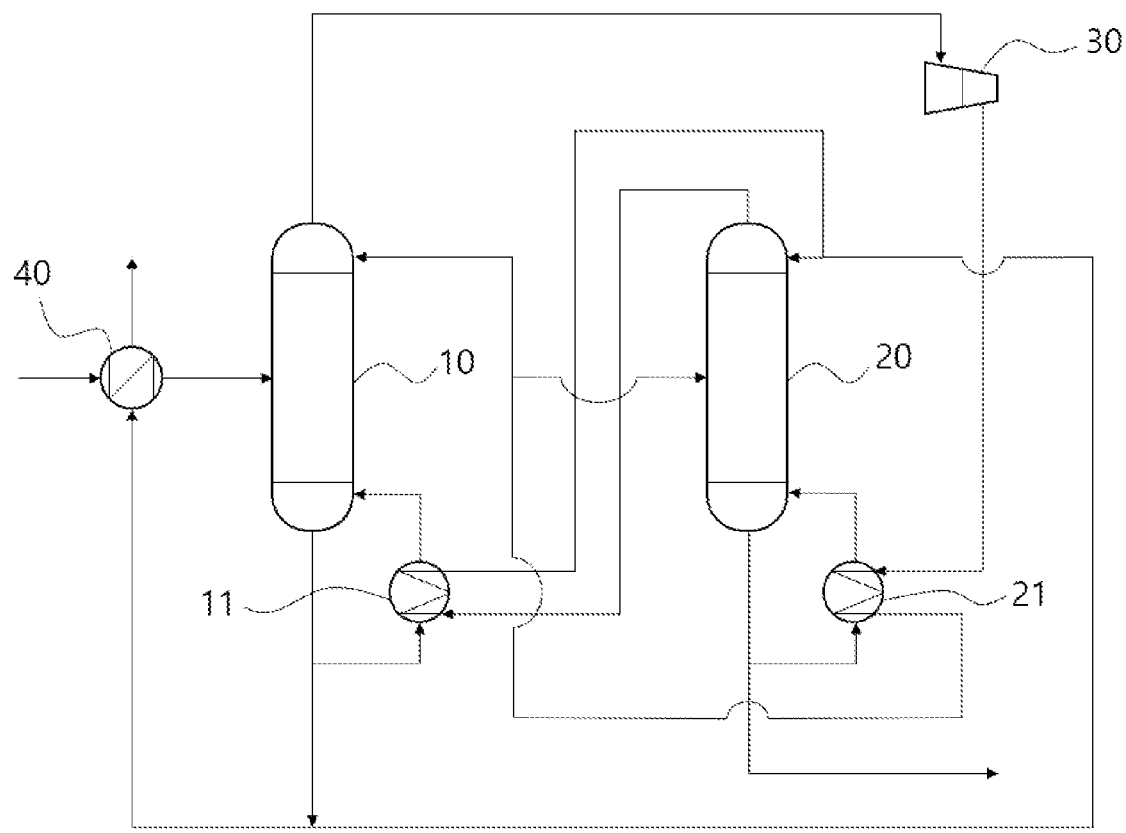

【FIG. 3】
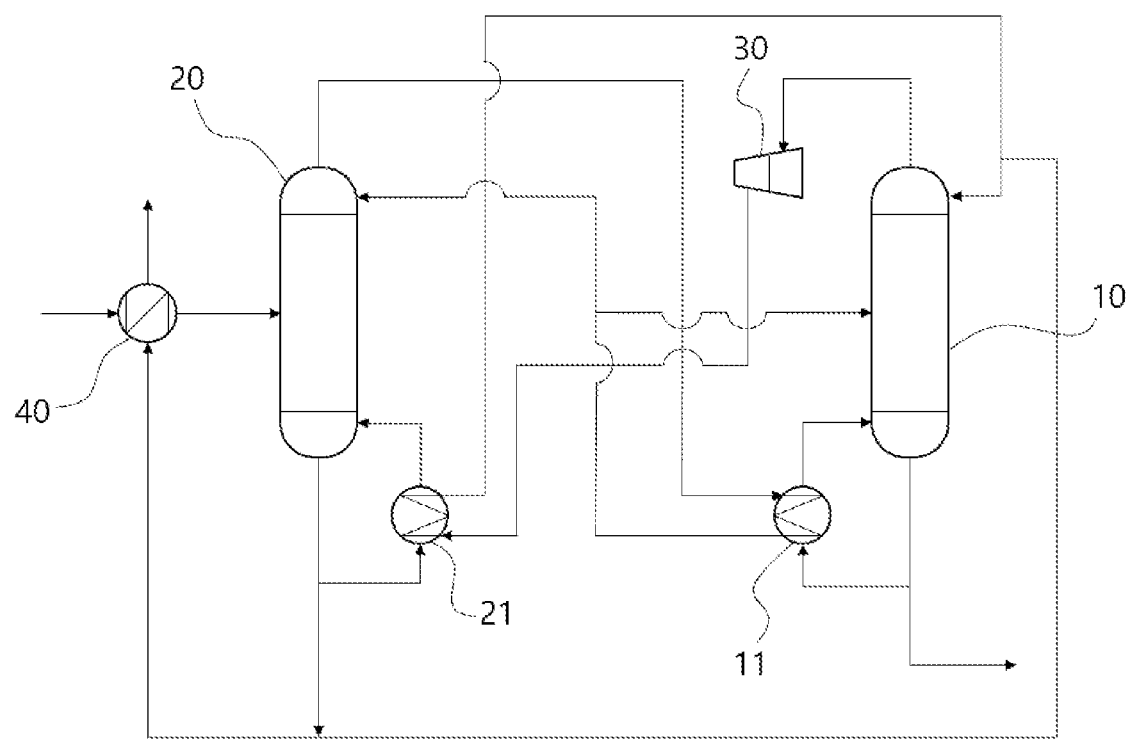

【FIG. 4】
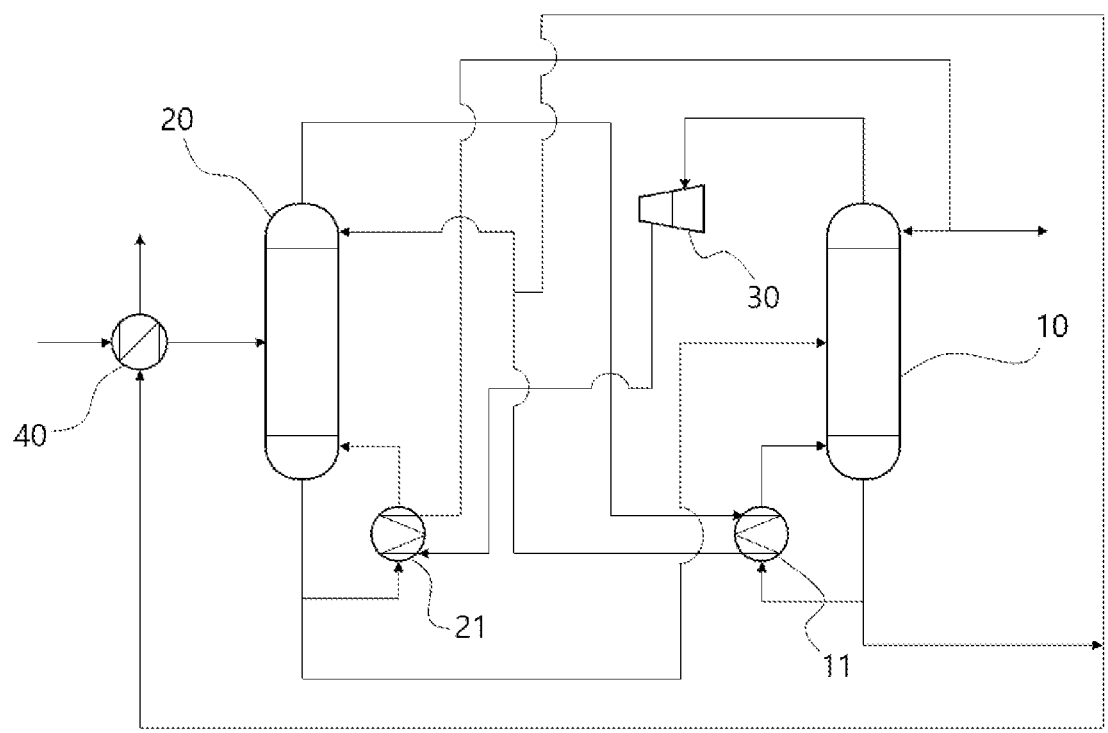

【FIG. 5】
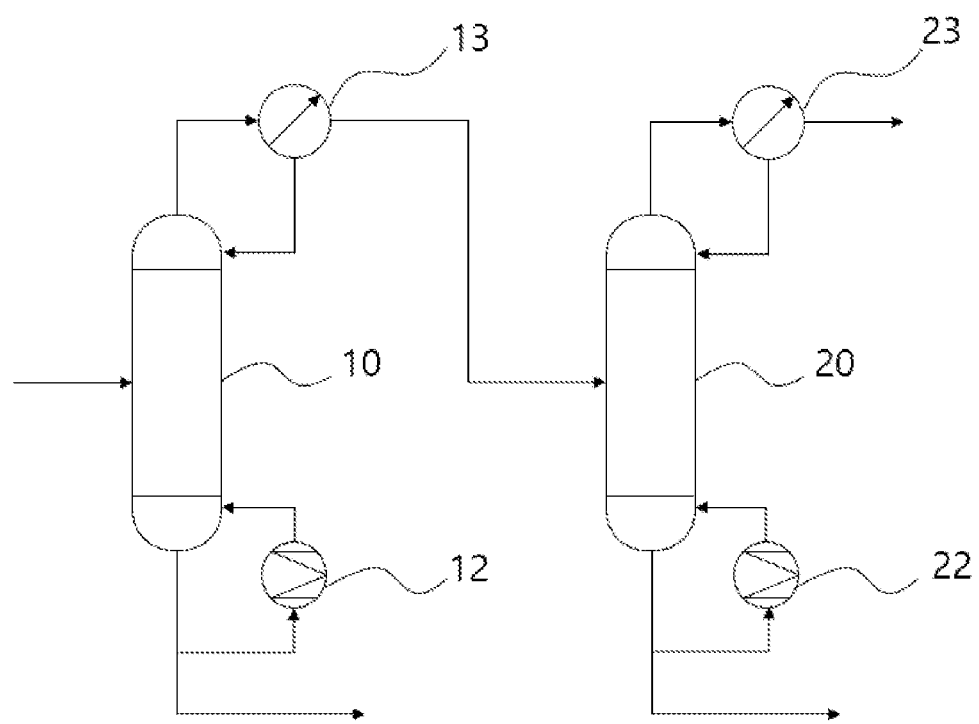

[FIG. 6]
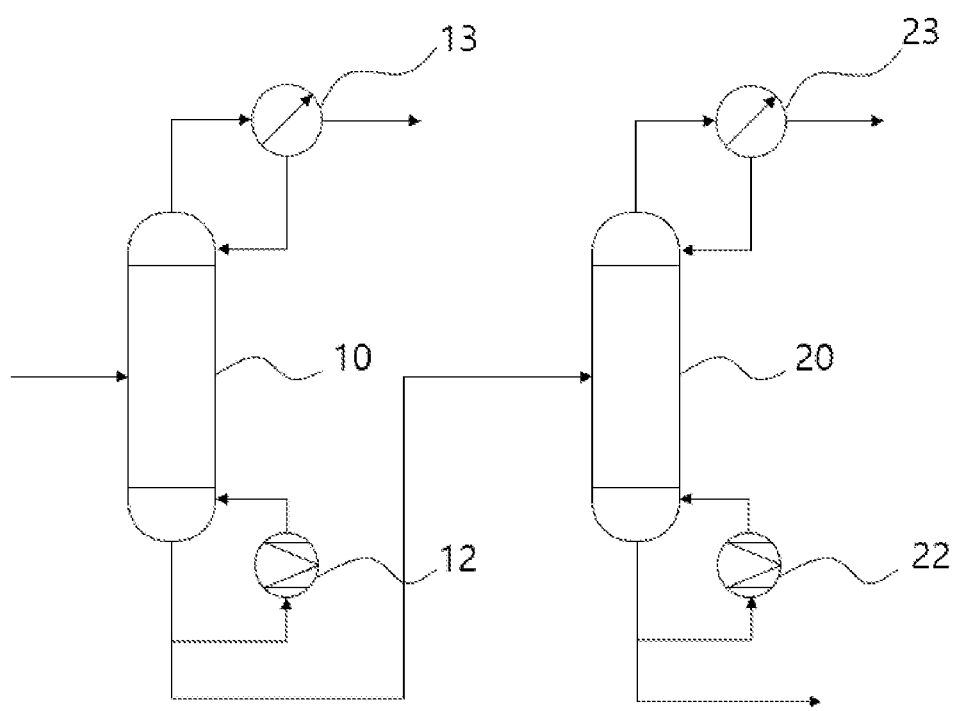

[FIG. 7]
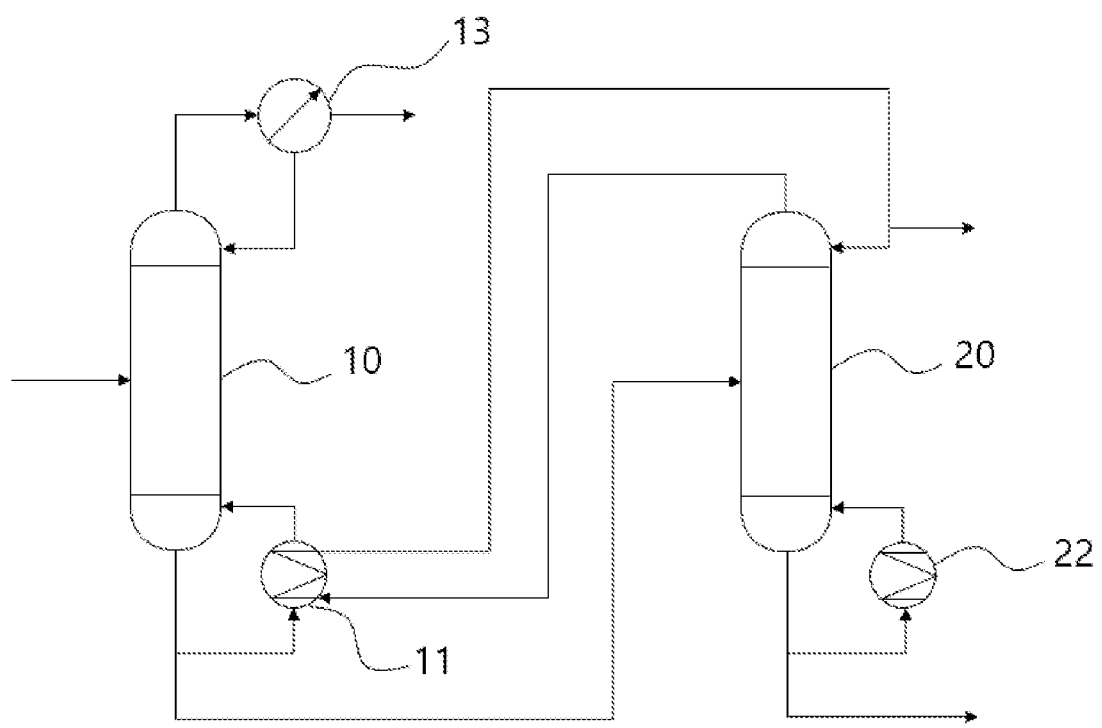

HEAT INTEGRATION SEPARATION SYSTEM

CROSS-REFERENCE TO RELATED APPLICATION

The present application is a National Phase entry pursuant to 35 U.S.C. § 371 of International Application No. PCT/KR2022/008578, filed on Jun. 16, 2022, and claims the benefit of and priority to Korean Patent Application No. 10-2021-0134244, filed on Oct. 8, 2021, the entire contents of which are incorporated by reference in their entirety for all purposes as if fully set forth herein.

TECHNICAL FIELD

The present disclosure relates to a heat integration separation system, and more particularly, to a system for separating a multi-component mixture containing three or more components, without using additional cooling energy or heating energy in separating the multi-component mixture.

BACKGROUND

In a chemical process, a process for separating a desired product from other components in a multi-component mixture containing three or more components may be performed using a multi-stage column. For example, the mixture containing the three or more components may include a low boiling point component, a product, and a high boiling point component having different boiling points, and two or more columns may be required to separate each component.

For example, a mixture containing three or more components may be supplied to a column of a previous stage, a high boiling point component may be separated downwardly in the column of the previous stage, a low boiling point component and a medium boiling point component may be supplied to a column of a rear stage, and the low boiling point component may be separated upwardly and the medium boiling point component may be separated downwardly in the column of the rear stage. In addition, a mixture containing three or more components may be supplied to the column of the previous stage, a low boiling point component may be separated upwardly in the column of the previous stage, a middle boiling point component and a high boiling point component may be separated downwardly, the middle boiling point component and the high boiling point component may be supplied to the column of the rear stage, and the middle boiling point component may be separated upwardly and the high boiling point component may be separated downwardly in the column of the rear stage.

As such, when the multi-component mixture is separated using two or more columns, cooling energy is used in a condenser above the column and heating energy is used in a reboiler below the column. In addition, due to the occurrence of carbon dioxide according to the use of the heating energy, a problem of sustainability arises continuously.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

An object of the present disclosure is to provide a heat integration separation system which operates using waste heat during a process to save energy and does not use external fossil fuels in separating a mixture containing three or more components using two columns.

In one general aspect, a heat integration separation system includes a first column; a second column; a compressor; a first heat exchanger; and a second heat exchanger, wherein an upper discharge stream of the first column passes through the compressor to be compressed and then heat-exchanged with a lower discharge stream of the second column in the second heat exchanger, wherein an upper discharge stream of the second column is heat-exchanged with a lower discharge stream of the first column in the first heat exchanger, and wherein the heat integration separation system satisfies Equation 1:

$$T1 < T2 < T3 < T4 \qquad \text{[Equation 1]}$$

wherein, in Equation 1, $T1$ is a temperature of the lower discharge stream of the first column that is refluxed to the first column after heat exchange in the first heat exchanger, $T2$ is a temperature of the upper discharge stream of the second column that is refluxed to the second column after heat exchange in the first heat exchanger, $T3$ is a temperature of the lower discharge stream of the second column that is refluxed to the second column after heat exchange in the second heat exchanger, and $T4$ is a temperature of the upper discharge stream of the first column that is refluxed to the first column after heat exchange in the second heat exchanger.

According to the heat integration separation system of the present disclosure, the lower discharge stream of the first column is heated by utilizing waste heat of the upper discharge stream of the second column by adjusting an operating pressure of the first column and the second column, and the upper discharge stream of the first column is compressed by using a compressor in a situation in which it is difficult to exchange heat between the upper discharge stream of the first column and the lower discharge stream of the second column, so that the upper discharge stream of the first column and the lower discharge stream of the second column may be heat-exchanged without using additional fossil fuels, thereby reducing the occurrence of carbon dioxide.

BRIEF DESCRIPTION OF DRAWINGS

FIGS. 1 to 4 are each a process flow diagram of a heat integration separation system according to Examples of the present disclosure.

FIGS. 5 to 7 are each a process flow diagram of a heat integration separation system according to Comparative Examples.

DETAILED DESCRIPTION

Terms and words used in the present specification and claims are not to be construed as a general or dictionary meaning but are to be construed as meanings and concepts meeting the technical ideas of the present disclosure based on a principle that the inventors may appropriately define the concepts of terms in order to describe their own inventions in the best mode.

The term. 'stream' used herein may refer to a flow of fluid in a process, and may also refer to a fluid is self flowing in a pipe. Specifically, the 'stream' may refer to both a fluid itself flowing in a pipe connecting respective devices to each other and a flow of the fluid. In addition, the fluid may include any one or more components of a gas, a liquid, and a solid.

Hereinafter, the present disclosure will be described in more detail with reference to FIGS. 1 to 4 to help the understanding of the present disclosure.

According to the present disclosure, a heat integration separation system is provided. The heat integration separation system may include a first column 10 and a second column 20, wherein a upper discharge stream of the first column 10 may pass through a compressor 30 to be compressed and then heat-exchanged with a lower discharge stream of the second column 20 in a second heat exchanger, and a upper discharge stream of the second column 20 may be heat-exchanged with a lower discharge stream of the first column 10 in a first heat exchanger 11.

In a chemical process, a process for separating a desired product from other components in a multi-component mixture containing three or more components may be performed using a multi-stage column. For example, the mixture containing the three or more components may include a low boiling point component, a product, and a high boiling point component having different boiling points, and two or more columns may be required to separate each component.

As such, when the multi-component mixture is separated using two or more columns, cooling energy is used in a condenser above the column and heating energy is used in a reboiler below the column. In addition, due to the occurrence of carbon dioxide according to the use of the heating energy, a problem of sustainability arises continuously.

In contrast, the present disclosure provides a heat integration separation system capable of reducing energy consumption when separating a multi-component mixture containing a product using two or more columns, and reducing the occurrence of carbon dioxide by not using additional fossil fuels as heating energy.

According to an embodiment of the present disclosure, the heat integration separation system may be applied in various fields for separating a product contained in a feed stream including three or more components using the first column 10 and the second column 20.

The feed stream may be a multi-component mixture that may occur during a chemical process. The multi-component mixture may contain three or more materials, and specifically, may include a product, a high-boiling-point material, and a low-boiling-point material. For example, the feed stream may include a multi-component mixture stream from a naphtha cracking process and a reaction product stream from various reactions. As a specific example, the feed stream may be a non-aromatic hydrocarbon stream occurring in a naphtha cracking process, and n-hexane may be separated from the non-aromatic hydrocarbon stream using the heat integration separation system.

The content of the product in the feed stream may be 10 wt % to 40 wt %, the content of the low-boiling-point material may be 30 wt % to 60 wt %, and the content of the high-boiling-point material may be 30 wt % to 60 wt %.

According to an embodiment of the present disclosure, the first column 10 and the second column 20 may each be a device for separating using a boiling point difference between components in the feed stream through distillation.

The upper discharge stream and the lower discharge stream of the first column 10 and the second column 20 may each be branched before or after heat exchange in the first heat exchanger 11 and the second heat exchanger 21. A branched partial stream may be refluxed, and the remaining stream may be sent to a rear stage column or separated.

According to an embodiment of the present disclosure, operating pressures of the first column 10 and the second column 20 may be different. For example, the operating pressure of the first column 10 may be lower than the operating pressure of the second column 20, and as a specific example, the operating pressure of the first column 10 may be lower by 0.5 $kg/cm^2 \cdot g$ or more, 0.6 $kg/cm^2 \cdot g$ or more, or 0.75 $kg/cm^2 \cdot g$ or more and 1 $kg/cm^2 \cdot g$ or less, 1.15 $kg/cm^2 \cdot g$ or less, or 1.5 $kg/cm^2 \cdot g$ or less than the operating pressure of the second column 20. By controlling the operating pressure of the first column 10 and the second column 20 within the above range, the upper discharge stream of the second column 20 may be heat-exchanged with the lower discharge stream of the first column in the first heat exchanger 11, while the separation efficiency in the first column 10 and the second column 20 is increased.

In order to perform sufficient heat exchange between the streams in the process, there should be a difference in temperature between the streams, and to this end, the operating pressure of the column providing energy, for example, the second column 20, may be increased. As such, when the operating pressure of the second column 20 is increased, the temperature of the upper discharge stream may be increased, so that heat exchange with the lower discharge stream of the first column 10 may be facilitated, but at the same time, the temperature of the lower discharge stream of the second column 20 is also increased. In this case, in addition to the low temperature of the upper discharge stream of the first column 10 operated at low pressure, compared with the second column 20, the temperature of the lower discharge stream of the second column 20 may be increased, and as a result, the upper discharge stream of the first column 10 and the lower discharge stream of the second column 20 may not have an appropriate temperature difference and it may be difficult to exchange heat therebetween. In addition, even if heat exchange is performed in the second heat exchanger 21, the upper discharge stream of the first column 10 requires a cooler and cooling energy for additional cooling, and the lower discharge stream of the second column 20 requires a heater and heating energy for additional heating.

According to an embodiment of the present disclosure, the upper discharge stream of the first column 10 may be compressed using the compressor 30 to increase a temperature due to gas characteristics, and the upper discharge stream of the first column 10 increased in temperature may be heat exchanged with the lower discharge stream of the second column 20. Specifically, the upper discharge stream of the first column 10 may pass through the compressor 30 to be compressed, and then heat-exchanged with the lower discharge stream of the second column 20 in the second heat exchanger 21.

A compression degree of the upper discharge stream of the first column 10 may be controlled according to thermal energy required by the compressor 30, and the pressure after passing through the compressor 30 may be 1 $kg/cm^2 \cdot g$ to 30 $kg/cm^2 \cdot g$ higher than that before passing through the compressor 30.

In general, there is a limit to increasing the temperature and thermal energy of the fluid by compressing gas with the compressor 30, and, for example, heat transfer efficiency of the heat exchanger may be increased by increasing the temperature by compressing up to 30 $kg/cm^2 \cdot g$. However, even in this case, heat energy of the compressed fluid is insufficient, so temperature reversal may occur after heat exchange without additional heating. Therefore, even if the upper discharge stream of the first column 10 is simply compressed to the maximum capacity of the compressor 30, the temperature may be increased, but since thermal energy is insufficient, when heat-exchanged with the lower discharge stream of the second column 20, additional heating energy may be required due to insufficient thermal energy of the compressed fluid. In this connection, in the present disclosure, the temperature after heat exchange is controlled to prevent temperature reversal through sufficient thermal energy, so that the process may be operated without using additional heating energy.

According to an embodiment of the present disclosure, in separating the product in the feed stream using the first column 10 and the second column 20, the heat integration separation system may be operated to satisfy Equation 1 below, so that the heat integration separation system may be operated without using additional fossil fuels.

$$T1 < T2 < T3 < T4 \quad \text{[Equation 1]}$$

In Equation 1, T1 is a temperature of the lower discharge stream of the first column 10 that is refluxed to the first column 10 after heat exchange in the first heat exchanger 11, T2 is a temperature of the upper discharge stream of the second column 20 that is refluxed to the second column 20 after heat exchange in the first heat exchanger 11, T3 is a temperature of the lower discharge stream of the second column 20 that is refluxed to the second column 20 after heat exchange in the second heat exchanger 21, and T4 is a temperature of the upper discharge stream of the first column 10 that is refluxed to the first column 10 after heat exchange in the second heat exchanger 21.

Specifically, in Equation 1, T1, T2, T3, and T4, which are the temperatures of the streams heat-exchanged in the first heat exchanger 11 or the second heat exchanger 21, respectively, may be affected by a flow rate of the feed stream, the operating conditions of the first column 10 and the second column 20, the temperature, composition, flow rate, etc. of each stream heat-exchanged in the first heat exchanger 11 or the second heat exchanger 21. When Equation 1 is not satisfied, the temperature reversal may occur after heat exchange, so heat exchange is impossible without additional fuel use, or the heat exchange efficiency is lowered, so that fossil fuels are additionally used as heating energy, resulting in the occurrence of carbon dioxide. As a specific example, when the temperature reversal occurs after heat exchange between the low temperature T1 and the high temperature T2, T2 becomes lower than T1, so it can be seen that the heat exchange from T2 to T1 is not sufficiently performed, and even when the temperatures are equal after the low temperature T1 and the high temperature T2 are heat-exchanged, it can be seen that the heat exchange efficiency is low because T2 and T1 are equal, so the heat exchange was not sufficiently performed. Therefore, in both cases, it is necessary to use additional heating energy to increase T2, and there is a problem in that carbon dioxide occurs due to the use of fuel in this process.

T1 and T2, and T3 and T4 may each have a difference of 0.1° C. or more, 0.6° C. or more, 1.2° C. or more, 2° C. or more, or 2.2° C. or more, and 2° C. or less, 2.5° C. or less, 3° C. or less, 4° C. or less, 5° C. or less, or 6° C. or less. Specifically, if T1 is lower than T2 or T3 is lower than T4, heat exchange may be impossible due to temperature reversal, and if T1 and T2 are equal or T3 and T4 are equal, heat exchange efficiency may be deteriorated. In addition, since T1 and T2, and T3 and T4 each have a temperature difference within the above range, the stream serving as a warm medium providing heat among the streams to be heat exchanged has sufficient thermal energy, so that heat exchange is possible effectively and the use of additional heating energy may not be required.

In addition, T1 and T2 may have a difference of 0.1° C. or more, 0.3° C. or more, 0.6° C. or more, 1° C. or more, 2° C. or more, or 2.2° C. or more, and 2.5° C. or less, 2.8° C. or less, or 3° C. or less. If the difference between T1 and T2 is more than 3° C., even if the third heat exchanger 40 is fully utilized, a problem of occurrence a temperature reversal between T3 and T4 may arise.

According to an embodiment of the present disclosure, the feed stream may be heated before being supplied to the first column 10 or the second column 20. For example, a general heating method includes a heating method using heating energy in a heater, but in the heat integration separation system operated as in the present disclosure, waste heat in the process may be utilized to heat the feed stream, without using additional heating energy.

When the feed stream is supplied to the first column 10 or the second column 20, a product, a low-boiling-point material, and a high-boiling-point material contained in the feed stream may be separated from each other in the first column 10 or the second column 20. At this time, the low-boiling-point material may be separated from the upper discharge stream of the first column 10 or the second column 20, and the high-boiling-point material may be separated from the lower discharge stream of the first column 10 or the second column 20.

The stream including the low-boiling-point material and the stream including the high-boiling-point material may form a mixed stream and may be discharged from the system, and the mixed stream may exchange heat with the feed stream in the third heat exchanger 40 before being discharged. Specifically, additional heating energy may not be used to heat the feed stream by heating the feed stream using waste heat of the mixed stream of the stream including the low-boiling-point material and the stream including the high-boiling-point material, and, by heating the feed stream, a flow rate of the upper discharge stream of the first column 10 may be increased to satisfy Equation 1, and heat exchange efficiency with the lower discharge stream of the second column 20 may be increased without temperature reversal.

After heat exchange in the third heat exchanger 40, a temperature difference between the mixed stream of the stream including the low-boiling-point material and the stream including the high-boiling-point material and the feed stream may be 0.1° C. or more, 1° C. or more, 1.5° C. or more, 1.8° C. or more, 2° C. or more or 2.5° C. or more and 3° C. or less, 5.7° C. or less, 6° C. or less, 7° C. or less, 8° C. or less, 9° C. or less, or 10° C. or less. The temperature of the feed stream after the heat exchange may be affected by the temperature, composition, and flow rate of the feed stream and the mixed stream, and by adjusting the temperature difference between the mixed stream and the feed stream after heat exchange in the third heat exchanger 40 within the above range, Equation 1 may be satisfied, and operating conditions optimized for the heat integration separation system according to the present disclosure may be implemented.

According to an embodiment of the present disclosure, a product, a low-boiling-point material, and a high-boiling-point material in the feed stream may be separated through various operations using the first column 10 and the second column 20.

As an example, as shown in FIG. 1, a feed stream may be supplied to the first column 10, a low-boiling-point material may be separated from the upper discharge stream of the first column 10, a product may be separated from the upper discharge stream of the second column 20, and a high-boiling-point material may be separated from the lower discharge stream of the second column 20. Specifically, after the feed stream passes through the third heat exchanger 40, the feed stream may be supplied to the first column 10, a partial stream of the lower discharge stream of the first column 10 may be supplied to the first heat exchanger 11 to be heat-exchanged with the upper discharge stream of the second column 20 and then refluxed to the first column 10, and the remaining stream may be supplied to the second column 20. In addition, the upper discharge stream of the first column 10 may be compressed in the compressor 30 and supplied to the second heat exchanger 21 to exchange heat with a partial stream of the lower discharge stream of the second column 20, and then the partial stream may be refluxed to the first column 10, a low-boiling-point material may be separated from the remaining stream, and the remaining stream may be heat-exchanged with the feed stream in the third heat exchanger 40 and then discharged. In addition, after the upper discharge stream of the second column 20 is heat-exchanged in the first heat exchanger 11, a partial stream may be refluxed to the second column 20, and a product may be separated from the remaining stream. In addition, a partial stream of the lower discharge stream of the second column 20 may pass through the second heat exchanger 21 and may then be refluxed to the second column 20, a high-boiling-point material may be separated from the remaining stream, and the remaining stream may be heat-exchanged with the feed stream in the third heat exchanger 40 and then discharged. At this time, the remaining stream of the upper discharge stream of the first column 10 passing through the second heat exchanger 21 may form a mixed stream with the remaining stream of the lower discharge stream of the second column 20, and the mixed stream may be heat-exchanged with the feed stream in the third heat exchanger 40 and then discharged.

As another example, as shown in FIG. 2, a feed stream may be supplied to the first column 10, a high-boiling-point material may be separated from the lower discharge stream of the first column 10, a low-boiling-point material may be separated from the upper discharge stream of the second column 20, and a product may be separated from the lower discharge stream of the second column 20. Specifically, after the feed stream passes through the third heat exchanger 40, the feed stream may be supplied to the first column 10, a partial stream of the lower discharge stream of the first column 10 may be supplied to the first heat exchanger 11 to be heat-exchanged with the upper discharge stream of the second column 20 and then refluxed to the first column 10, a high-boiling-point material may be separated from the remaining stream, and the remaining stream may be heat-exchanged with the feed stream in the third heat exchanger 40 and then discharged. In addition, the upper discharge stream of the first column 10 may be compressed in the compressor 30 and supplied to the second heat exchanger 21 to exchange heat with a portion of the lower discharge stream of the second column 20, and then a partial stream is refluxed to the first column 10, and the remaining stream may be supplied to the second column 20. In addition, after the upper discharge stream of the second column 20 is heat-exchanged in the first heat exchanger 11, a partial stream may be refluxed to the second column 20, a low-boiling-point material may be separated from the remaining stream, and the remaining stream may be heat-exchanged with the feed stream in the third heat exchanger 40 and then discharged. In addition, a partial stream of the lower discharge stream of the second column 20 may pass through the second heat exchanger 21 and may then be refluxed to the second column 20, and a product may be separated from the remaining stream. At this time, the remaining stream of the upper discharge stream of the second column 20 passing through the first heat exchanger 11 may form a mixed stream with the remaining stream of the lower discharge stream of the first column 10, and the mixed stream may be heat-exchanged with the feed stream in the third heat exchanger 40 and then discharged.

As another example, as shown in FIG. 3, a feed stream may be supplied to the second column 20, a high-boiling-point material may be separated from the lower discharge stream of the second column 20, a low-boiling-point material may be separated from the upper discharge stream of the first column 10, and a product may be separated from the lower discharge stream of the first column 10. Specifically, after the feed stream passes through the third heat exchanger 40, the feed stream may be supplied to the second column 20, a partial stream of the lower discharge stream of the second column 20 may be supplied to the second heat exchanger 21 to be heat-exchanged with the upper discharge stream of the first column 10 compressed through the compressor 30 and then refluxed to the second column 20, a high-boiling-point material may be separated from the remaining stream, and the remaining stream may be heat-exchanged with the feed stream in the third heat exchanger 40 and then discharged. In addition, the upper discharge stream of the second column 20 may be supplied to the first heat exchanger 11 to be heat-exchanged with a partial stream of the lower discharge stream of the first column 10, and then, the partial stream may be refluxed to the second column 20, and the remaining stream may be supplied to the first column 10. In addition, the upper discharge stream of the first column 10 may be compressed in the compressor 30 to be supplied to the second heat exchanger 21, heat-exchanged in the second heat exchanger 21, and then, a partial stream may be refluxed to the first column 10, a low-boiling-point material may be separated from the remaining stream, and the remaining stream may be heat-exchanged with the feed stream in the third heat exchanger 40 and then discharged. In addition, a partial stream of the lower discharge stream of the first column 10 may pass through the first heat exchanger 11 and may then be refluxed to the first column 10, and a product may be separated from the remaining stream. At this time, the remaining stream of the upper discharge stream of the first column 10 passing through the second heat exchanger 21 may form a mixed stream with the remaining stream of the lower discharge stream of the second column 20, and the mixed stream may be heat-exchanged with the feed stream in the third heat exchanger 40 and then discharged.

As another example, as shown in FIG. 4, a feed stream may be supplied to the second column 20, a low-boiling-point material may be separated from the upper discharge stream of the second column 20, a product may be separated from the upper discharge stream of the first column 10, and a high-boiling-point material may be separated from the lower discharge stream of the first column 10. Specifically, after the feed stream passes through the third heat exchanger 40, the feed stream may be supplied to the second column 20, a partial stream of the lower discharge stream of the second column 20 may be supplied to the second heat exchanger 21 to be heat-exchanged with the upper discharge stream of the first column 10 compressed through the compressor 30 and then refluxed to the second column 20, and the remaining stream may be supplied to the first column 10. In addition, the upper discharge stream of the second column 20 may be supplied to the first heat exchanger 11 to be heat-exchanged with a partial stream of the lower discharge stream of the first column 10, and then, the partial stream may be refluxed to the second column 20, a low-boiling-point material may be separated from the remaining stream, and the remaining stream may be heat-exchanged with the feed stream in the third heat exchanger 40 and may then be discharged. In addition, the upper discharge stream of the first column 10 may be compressed in the compressor 30 to be supplied to the second heat exchanger 21, heat-exchanged in the second heat exchanger 21, and then, a partial stream may be refluxed to the first column 10, a product may be separated from the remaining stream. In addition, a partial stream of the lower discharge stream of the first column 10 may pass through the first heat exchanger 11 and may then be refluxed to the first column 10, a high-boiling-point material may be separated from the remaining stream, and the remaining stream may be heat-exchanged with the feed stream in the third heat exchanger 40 and then discharged. At this time, the remaining stream of the upper discharge stream of the second column 20 passing through the first heat exchanger 11 may form a mixed stream with the remaining stream of the lower discharge stream of the first column 10, and the mixed stream may be heat-exchanged with the feed stream in the third heat exchanger 40 and then discharged.

According to an embodiment of the present disclosure, the content of the product in the stream from which the product is separated, for example, the upper discharge stream or the lower discharge stream of the first column 10 or the second column 20, may be 50 wt % to 85 wt %. In addition, a recovery rate of the product may be 60% to 95%. In this case, the recovery rate of the product may refer to a content ratio of the product in the stream from which the product is separated relative to the content of the product included in the feed stream.

According to an embodiment of the present disclosure, in the heat integration separation system, a device of a column, a condenser, a reboiler, a valve, a pump, a separator, and a mixer may be additionally installed, if necessary.

As mentioned above, although the heat integration separation system according to the present disclosure has been described and shown in the drawings, in the descriptions and the drawings above, only the essential components for understanding the present disclosure are described and illustrated, and a process and a device not separately described and not shown may be appropriately applied and used to implement the heat integration separation system according to the present disclosure.

Hereinafter, the present disclosure will be described in more detail by way of examples. However, the following examples are intended to illustrate the present disclosure, and it is apparent to those skilled in the art that various changes and modifications may be made within the scope and spirit of the present disclosure, and the scope of the present disclosure is not limited thereto.

EXAMPLES

Example 1

As shown in the process flow diagram shown in FIG. 1, the heat integration separation system was verified using a commercial simulation tool (Aspen Plus manufactured by Aspen Corporation).

Specifically, a feed stream containing 20 wt % of n-hexane, 40 wt % of a low-boiling-point material, and 40 wt % of a high-boiling-point material passed through the third heat exchanger 40 and was then supplied to the first column 10 and a partial stream of the lower discharge stream of the first column 10 was supplied to the first heat exchanger 11, heat-exchanged with the upper discharge stream of the second column 20, and then refluxed to the first column 10, and the remaining stream was supplied to the second column 20. In addition, the upper discharge stream of the first column 10 was compressed in the compressor 30 and supplied to the second heat exchanger 21 to exchange heat with a partial stream of the lower discharge stream of the second column 20, and then a partial stream was refluxed to the first column 10, and the remaining stream including the low-boiling-point material was separated, heat-exchanged with the feed stream in the third heat exchanger 40, and then discharged. At this time, an operating pressure of the first column 10 was adjusted to 0.5 kg/cm²·g.

After the upper discharge stream of the second column was heat-exchanged in the first heat exchanger 11, a partial stream was refluxed to the second column 20, and a product was separated from the remaining stream. In addition, a partial stream of the lower discharge stream of the second column 20 was passed through the second heat exchanger 21 and was then refluxed to the second column 20, and the remaining stream containing a high-boiling-point material was separated, heat-exchanged with the feed stream in the third heat exchanger 40 and then discharged. At this time, the remaining stream of the upper discharge stream of the first column 10 that has passed through the second heat exchanger 21 and the remaining stream of the lower discharge stream of the second column 20 formed a mixed stream, and the mixed stream was heat-exchanged with the feed stream in the third heat exchanger 40 and then discharged. In addition, an operating pressure of the second column 20 was adjusted to 1.4 kg/cm²·g.

In Examples and Comparative Examples, the operation was performed so that the content of the product in the stream from which the product was separated and a recovery rate of the product were the same.

A temperature $T_{in}$ of the feed stream supplied to the first column 10 after heat exchange in the third heat exchanger 40, a temperature T1 of the lower discharge stream of the first column 10 refluxed to the first column 10 after heat exchange in the first heat exchanger 11, a temperature T2 of the upper discharge stream of the second column 20 refluxed to the second column 20 after heat exchange in the first heat exchanger 11, a temperature T3 of the lower discharge stream of the second column 20 refluxed to the second column 20 after heat exchange in the second heat exchanger 21, a temperature T4 of the upper discharge stream of the first column 10 refluxed to the first column 10 after heat exchange in the second heat exchanger 21, and a temperature $T_{out}$ of the mixed stream discharged after heat exchange in the third heat exchanger are shown in Table 1 below.

In addition, the amount of energy used in the process is shown in Table 2 below.

Example 2

As shown in the process flow diagram shown in FIG. 2, the heat integration separation system was verified using a commercial simulation tool (Aspen Plus manufactured by Aspen Corporation).

Specifically, a feed stream containing 20 wt % of n-hexane, 40 wt % of a low-boiling-point material, and 40 wt % of a high-boiling-point material passed through the third heat exchanger 40 and was then supplied to the first column 10 and a partial stream of the lower discharge stream of the first column 10 was supplied to the first heat exchanger 11, heat-exchanged with the upper discharge stream of the second column 20, and then refluxed to the first column 10, and the remaining stream including a high-boiling-point material was separated and heat-exchanged with the feed stream in the third heat exchanger 40, and then discharged. In addition, the upper discharge stream of the first column 10 was compressed in the compressor 30 and supplied to the second heat exchanger 21 to exchange heat with a partial stream of the lower discharge stream of the second column 20, and then a partial stream was refluxed to the first column 10, and the remaining stream was supplied to the second column 20. At this time, an operating pressure of the first column 10 was adjusted to 0.5 kg/cm$^2$·g.

After the upper discharge stream of the second column 20 was heat-exchanged in the first heat exchanger 11, a partial stream was refluxed to the second column 20, and a remaining stream including a low-boiling-point material was separated, heat-exchanged with the feed stream in the third heat exchanger 40, and then discharged. In addition, a partial stream of the lower discharge stream of the second column 20 was passed through the second heat exchanger 21 and was then refluxed to the second column 20, and a product was separated from the remaining stream. At this time, the remaining stream of the upper discharge stream of the second column 20 that has passed through the first heat exchanger 11 and the remaining stream of the lower discharge stream of the first column 10 formed a mixed stream, and the mixed stream was heat-exchanged with the feed stream in the third heat exchanger 40 and then discharged. In addition, an operating pressure of the second column 20 was adjusted to 1.65 kg/cm$^2$·g.

A temperature $T_{in}$ of the feed stream supplied to the first column 10 after heat exchange in the third heat exchanger 40, a temperature T1 of the lower discharge stream of the first column 10 refluxed to the first column 10 after heat exchange in the first heat exchanger 11, a temperature T2 of the upper discharge stream of the second column 20 refluxed to the second column 20 after heat exchange in the first heat exchanger 11, a temperature T3 of the lower discharge stream of the second column 20 refluxed to the second column 20 after heat exchange in the second heat exchanger 21, a temperature T4 of the upper discharge stream of the first column 10 refluxed to the first column 10 after heat exchange in the second heat exchanger 21, and a temperature $T_{out}$ of the mixed stream discharged after heat exchange in the third heat exchanger 40 are shown in Table 1 below.

In addition, the amount of energy used in the process is shown in Table 2 below.

Example 3

As shown in the process flow diagram shown in FIG. 3, the heat integration separation system was verified using a commercial simulation tool (Aspen Plus manufactured by Aspen Corporation).

Specifically, a feed stream containing 20 wt % of n-hexane, 40 wt % of a low-boiling-point material, and 40 wt % of a high-boiling-point material passed through the third heat exchanger 40 and was then supplied to the second column 20 and a partial stream of the lower discharge stream of the second column 20 was supplied to the second heat exchanger 21, heat-exchanged with the upper discharge stream of the first column 10 compressed through the compressor 30, and then refluxed to the second column 20, and the remaining stream including a high-boiling-point material was separated and heat-exchanged with the feed stream in the third heat exchanger 40, and then discharged. In addition, the upper discharge stream of the second column 20 was supplied to the first heat exchanger 11 to exchange heat with a partial stream of the lower discharge stream of the first column 10, and then a partial stream was refluxed to the second column 20, and the remaining stream was supplied to the first column 10. At this time, an operating pressure of the second column 20 was adjusted to 1.25 kg/cm$^2$·g.

After the upper discharge stream of the first column 10 was compressed in the compressor 30, supplied to the second heat exchanger 21, and heat-exchanged in the second heat exchanger 21, a partial stream was refluxed to the first column 10, and a remaining stream including a low-boiling-point material was separated, heat-exchanged with the feed stream in the third heat exchanger 40, and then discharged. In addition, a partial stream of the lower discharge stream of the first column 10 passed through the first heat exchanger 11 and was then refluxed to the first column 10, and a product was separated from the remaining stream. At this time, the remaining stream of the upper discharge stream of the first column 10 that has passed through the second heat exchanger 21 and the remaining stream of the lower discharge stream of the second column 20 formed a mixed stream, and the mixed stream was heat-exchanged with the feed stream in the third heat exchanger 40 and then discharged. In addition, an operating pressure of the first column 10 was adjusted to 0.5 kg/cm$^2$·g.

A temperature $T_{in}$ of the feed stream supplied to the second column 20 after heat exchange in the third heat exchanger 40, a temperature T1 of the lower discharge stream of the first column 10 refluxed to the first column 10 after heat exchange in the first heat exchanger 11, a temperature T2 of the upper discharge stream of the second column 20 refluxed to the second column 20 after heat exchange in the first heat exchanger 11, a temperature T3 of the lower discharge stream of the second column 20 refluxed to the second column 20 after heat exchange in the second heat exchanger 21, a temperature T4 of the upper discharge stream of the first column 10 refluxed to the first column 10 after heat exchange in the second heat exchanger 21, and a temperature $T_{out}$ of the mixed stream discharged after heat exchange in the third heat exchanger 40 are shown in Table 1 below.

In addition, the amount of energy used in the process is shown in Table 2 below.

Example 4

As shown in the process flow diagram shown in FIG. 4, the heat integration separation system was verified using a commercial simulation tool (Aspen Plus manufactured by Aspen Corporation).

Specifically, a feed stream containing 20 wt % of n-hexane, 40 wt % of a low-boiling-point material, and 40 wt % of a high-boiling-point material passed through the third heat exchanger 40 and was then supplied to the second column 20, a partial stream of the lower discharge stream of the second column 20 was supplied to the second heat exchanger 21, heat-exchanged with the upper discharge stream of the first column 10 compressed through the compressor 30, and then refluxed to the second column 20, and the remaining stream was supplied to the first column 10. In addition, the upper discharge stream of the second column 20 was supplied to the first heat exchanger 11 to exchange heat with a partial stream of the lower discharge stream of the first column 10, and then a partial stream was refluxed to the second column 20, and the remaining stream including a low-boiling-point material was separated, heat-exchanged with the feed stream in the third heat exchanger 40, and then discharged. At this time, an operating pressure of the second column 20 was adjusted to 1.65 kg/cm$^2$·g.

After the upper discharge stream of the first column 10 was compressed in the compressor 30, supplied to the second heat exchanger 21, and heat-exchanged in the second heat exchanger 21, a partial stream was refluxed to the first column 10, and a product was separated from a remaining stream. In addition, a partial stream of the lower discharge stream of the first column 10 passed through the first heat exchanger 11 and was then refluxed to the first column 10, and the remaining stream including a high-boiling-point material was separated, heat-exchanged with the feed stream in the third heat exchanger 40, and then discharged. At this time, the remaining stream of the upper discharge stream of the second column 20 that has passed through the first heat exchanger 11 and the remaining stream of the lower discharge stream of the first column 10 formed a mixed stream, and the mixed stream was heat-exchanged with the feed stream in the third heat exchanger 40 and then discharged. In addition, an operating pressure of the first column 10 was adjusted to 0.5 kg/cm$^2$·g.

A temperature $T_{in}$ of the feed stream supplied to the second column 20 after heat exchange in the third heat exchanger, a temperature T1 of the lower discharge stream of the first column 10 refluxed to the first column 10 after heat exchange in the first heat exchanger 11, a temperature T2 of the upper discharge stream of the second column 20 refluxed to the second column 20 after heat exchange in the first heat exchanger 11, a temperature T3 of the lower discharge stream of the second column 20 refluxed to the second column 20 after heat exchange in the second heat exchanger 21, a temperature T4 of the upper discharge stream of the first column 10 refluxed to the first column 10 after heat exchange in the second heat exchanger 21, and a temperature $T_{out}$ of the mixed stream discharged after heat exchange in the third heat exchanger are shown in Table 1 below.

In addition, the amount of energy used in the process is shown in Table 2 below.

COMPARATIVE EXAMPLES

Comparative Example 1

As shown in the process flow diagram shown in FIG. 5, the heat integration separation system was verified using a commercial simulation tool (Aspen Plus manufactured by Aspen Corporation).

Specifically, a feed stream containing 20 wt % of n-hexane, 40 wt % of a low-boiling-point material, and 40 wt % of a high-boiling-point material was supplied to the first column 10, a partial stream of the lower discharge stream of the first column 10 passed through a reboiler 12 to be refluxed to the first column 10, and a high-boiling-point material was separated from a remaining stream. In addition, after the upper discharge stream of the first column 10 passed through the condenser 13, a partial stream was refluxed to the first column 10, and a remaining stream was supplied to the second column 20.

The upper discharge stream of the second column 20 passed through a condenser 23, a partial stream was refluxed to the second column 20, and a low-boiling-point component was separated from the remaining stream. In addition, a partial stream of the lower discharge stream of the second column 20 passed through a reboiler 22, was refluxed to the second column 20, and a product was separated from the remaining stream.

At this time, operating conditions of the first column 10 and the second column 20 were each controlled to 0.5 kg/cm$^2$·g.

In addition, the amount of energy used in the process is shown in Table 2 below.

Comparative Example 2

As shown in the process flow diagram shown in FIG. 6, the heat integration separation system was verified using a commercial simulation tool (Aspen Plus manufactured by Aspen Corporation).

Specifically, a feed stream containing 20 wt % of n-hexane, 40 wt % of a low-boiling-point material, and 40 wt % of a high-boiling-point material was supplied to the first column 10, the upper discharge stream of the first column 10 passed through the condenser 13, and then, a partial stream was refluxed to the first column 10, and a low-boiling-point material was separated from a remaining stream. In addition, a partial stream of the lower discharge stream of the first column 10 passed through the reboiler 12 to be refluxed to the first column 10, and a remaining stream was supplied to the second column 20.

After the upper discharge stream of the second column 20 was passed through the condenser 23, a partial stream was refluxed to the second column 20, and a product was separated from the remaining stream. In addition, a partial stream of the lower discharge stream of the second column 20 passed through the reboiler 22, was refluxed to the second column 20, and a high-boiling-point material was separated from the remaining stream.

At this time, operating conditions of the first column 10 and the second column 20 were each controlled to 0.5 kg/cm$^2$·g.

In addition, the amount of energy used in the process is shown in Table 2 below.

Comparative Example 3

As shown in the process flow diagram shown in FIG. 7, the heat integration separation system was verified using a commercial simulation tool (Aspen Plus manufactured by Aspen Corporation).

Specifically, Comparative Example 3 was conducted in the same manner as that of Comparative Example 2, except that the lower discharge stream of the first column 10 and the upper discharge stream of the second column 20 were heat-exchanged in the first heat exchanger 11 in Comparative Example 2.

In addition, the amount of energy used in the process is shown in Table 2 below.

Comparative Examples 4 and 5

As a method of adjusting a flow rate of the mixed stream passing through the third heat exchanger 40 in Example 2, Comparative Examples 4 and 5 were conducted in the same manner as that of Example 1, except that a temperature of the feed stream supplied to the first column 10 through the third heat exchanger 40 was different.

A temperature $T_{in}$ of the feed stream supplied to the first column 10 after heat exchange in the third heat exchanger, a temperature T1 of the lower discharge stream of the first column 10 refluxed to the first column 10 after heat exchange in the first heat exchanger 11, a temperature T2 of the upper discharge stream of the second column 20 refluxed to the second column 20 after heat exchange in the first heat exchanger 11, a temperature T3 of the lower discharge stream of the second column 20 refluxed to the second column 20 after heat exchange in the second heat exchanger 21, a temperature T4 of the upper discharge stream of the first column 10 refluxed to the first column 10 after heat exchange in the second heat exchanger 21, and a temperature $T_{out}$ of the mixed stream discharged after heat exchange in the third heat exchanger are shown in Table 1 below.

TABLE 1

|  | $T_{in}$ | T1 | T2 | T3 | T4 | $T_{out}$ |
|---|---|---|---|---|---|---|
| Example 1 | 62.0 | 94.9 | 97.4 | 107.5 | 109.7 | 64.5 |
| Example 2 | 65.0 | 96.0 | 97.2 | 109.9 | 112.1 | 66.8 |
| Example 3 | 62.0 | 92.3 | 92.9 | 107.9 | 109.9 | 64.7 |
| Example 4 | 63.0 | 94.6 | 97.4 | 112.2 | 117.6 | 68.7 |
| Comparative Example 4 | 40.0 | 96.0 | 97.2 | 109.9 | 108.2 | 91.6 |
| Comparative Example 5 | 50.0 | 96.0 | 97.2 | 109.9 | 109.8 | 85.3 |

TABLE 2

|  |  | Example | | | | Comparative Example | | |
|---|---|---|---|---|---|---|---|---|
|  |  | 1 | 2 | 3 | 4 | 1 | 2 | 3 |
| Energy consumption | Cooling energy (%) | 0 | 0 | 0 | 0 | 182 | 185 | 100 |
| | Heating energy (%) | 0 | 0 | 0 | 0 | 187 | 187 | 100 |
| | Electric energy (%) | 100 | 108 | 108 | 115 | — | — | — |

In Table 2, the energy consumption was measured for each of cooling energy, heating energy, and electric energy. Specifically, in the case of Examples 1 to 4, the amount of electrical energy used in the compressor 30 was measured, and the amount of electrical energy used in Example 1 was converted into a percentage and displayed. In addition, in the case of Comparative Examples 1 to 3, the cooling energy and heating energy consumption were calculated in consideration of conversion efficiency to electric energy of about 30%, and the electric energy consumption in Example 1 was converted into a percentage and displayed.

Referring to Table 1 and Table 2, in the case of Examples 1 to 4 in which the product is separated from the feed stream using the heat integration separation system according to the present disclosure, energy consumption was reduced, and since additional cooling energy and heating energy were not used, an occurrence of carbon dioxide was reduced. In particular, in the case of Example 1, it can be seen that a maximum use temperature in the process was low and a waste heat recovery rate was high, so that the energy saving effect was the greatest.

In comparison, in Comparative Examples 1 and 2, in which waste heat was not reused through heat exchange in the process, it can be seen that the energy consumption was significantly increased compared to Examples 1 to 4, and in Comparative Example 3, the energy consumption was decreased through heat exchange between the streams in the process, compared to Comparative Examples 1 and 2, but the energy consumption was confirmed to be still high, compared to Examples 1 to 4.

In addition, it can be seen that, in Comparative Examples 4 and 5 in which the heat integration separation system is operated as in Examples 1 to 4 but does not satisfy the temperature condition of Equation 1, sufficient heat exchange is not achieved, so additional heating energy and cooling energy are required. Specifically, in the case of Comparative Examples 4 and 5, the temperature reversal occurred between T3 and T4, so that thermal energy of the upper discharge stream of the first column 10 refluxed to the first column 10 after heat exchange in the second heat exchanger 21 was not sufficient, and thus, it was difficult to exchange heat.

The invention claimed is:

1. A heat integration separation system, comprising:
   a first column;
   a second column;
   a compressor;
   a first heat exchanger; and
   a second heat exchanger,
   wherein an upper discharge stream of the first column passes through the compressor to be compressed and then heat-exchanged with a lower discharge stream of the second column in the second heat exchanger, and the upper discharge stream of the first column is refluxed to the first column after being heat-exchanged in the second heat exchanger,
   wherein an upper discharge stream of the second column is heat-exchanged with a lower discharge stream of the first column in the first heat exchanger, and the upper discharge stream of the second column is refluxed to the second column after being heat-exchange in the first heat exchanger, and
   wherein the heat integration separation system satisfies Equation 1:

$$T1<T2<T3<14 \quad \text{[Equation 1]}$$

wherein T1 is a temperature of the lower discharge stream of the first column that is refluxed to the first column after heat exchange in the first heat exchanger, T2 is a temperature of the upper discharge stream of the second column that is refluxed to the second column after heat exchange in the first heat exchanger, T3 is a temperature of the lower discharge stream of the second column that is refluxed to the second column after heat exchange in the second heat exchanger, and T4 is a temperature of the upper discharge stream of the first column that is refluxed to the first column after heat exchange in the second heat exchanger.

2. The heat integration separation system of claim 1, wherein the first column or the second column is supplied with a feed stream including a product, a high-boiling-point material, and a low-boiling-point material.

3. The heat integration separation system of claim 2, wherein:
   the low-boiling-point material is separated from the upper discharge stream of the first column or the second column, the high-boiling-point material is separated from the lower discharge stream of the first column or the second column, a stream including the separated low-boiling-point material and a stream including the separated high-boiling-point material form a mixed stream, and the mixed stream is heat-exchanged with a feed stream in a third heat exchanger.

4. The heat integration separation system of claim 3, wherein, after the heat exchange in the third heat exchanger, a temperature difference between the mixed stream and the feed stream is 0.1° C. to 10° C.

5. The heat integration separation system of claim 2, wherein:

the feed stream is supplied to the first column, the high-boiling-point material is separated from the lower discharge stream of the first column, the low-boiling-point material is separated from the upper discharge stream of the second column, and the product is separated from the lower discharge stream of the second column.

6. The heat integration separation system of claim 2, wherein:

the feed stream is supplied to the first column, the low-boiling-point material is separated from the upper discharge stream of the first column, the product is separated from the upper discharge stream of the second column, and the high-boiling-point material is separated from the lower discharge stream of the second column.

7. The heat integration separation system of claim 2, wherein:

the feed stream is supplied to the second column, the high-boiling-point material is separated from the lower discharge stream of the second column, the low-boiling-point material is separated from the upper discharge stream of the first column, and the product is separated from the lower discharge stream of the first column.

8. The heat integration separation system of claim 2, wherein:

the feed stream is supplied to the second column, the low-boiling-point material is separated from the upper discharge stream of the second column, the product is separated from the upper discharge stream of the first column, and the high-boiling-point material is separated from the lower discharge stream of the first column.

9. The heat integration separation system of claim 1, wherein an operating pressure of the first column is 0.5 kg/cm²·g to 1.5 kg/cm²·g lower than an operating pressure of the second column.

10. The heat integration separation system of claim 1, wherein T1 and T2, and T3 and T4 each have a difference of 0.1° C. to 6° C.

11. The heat integration separation system of claim 1, wherein T1 and T2 have a difference of 0.1° C. to 3° C.

* * * * *